May 4, 1943.  W. N. BODKIN  2,318,048
AUTOMATIC PROGRAM CONTROL MECHANISM
Filed Oct. 15, 1940  2 Sheets-Sheet 1

WITNESS:
Robt R Mitchel.

INVENTOR
William N. Bodkin
BY
Augustus B Stoughton
ATTORNEY.

May 4, 1943. W. N. BODKIN 2,318,048
AUTOMATIC PROGRAM CONTROL MECHANISM
Filed Oct. 15, 1940 2 Sheets-Sheet 2

WITNESS:
Robt R Kitchel

INVENTOR
William N. Bodkin
BY
Augustus B Stoughton
ATTORNEY.

Patented May 4, 1943

2,318,048

UNITED STATES PATENT OFFICE 2,318,048

AUTOMATIC PROGRAM CONTROL MECHANISM

William N. Bodkin, Manoa, Pa.

Application October 15, 1940, Serial No. 361,238

5 Claims. (Cl. 161—1)

Automatic program control mechanism is useful in many arts but I shall described such mechanism of my invention in use as an automatic train dispatcher and in that case a visual or audible signal is given to inform train crews of starting time from terminal or intermediate points. The signals are provided in accordance with a predetermined schedule which may cover any desired period, such as twenty-four hours, and which automatically repeats the cycle. The time intervals with given signals can be changed throughout the cycle in accordance with a railway, street car or bus schedule which involves units of time and fractions of such units.

The principal objects of the present invention are to provide automatic program control mechanism of simple reliable and readily adjusted construction.

Other objects of the invention will appear from the following description at the end of which the invention will be claimed.

Generally stated the invention comprises a photo-electric relay operating a controller or signal; a photo-electric cell operating the relay; a light source including a lens system continuously and uninterruptedly directing a beam of light on the cell; an endless opaque tape movable between the lens system and the photo-cell and perforated in accordance with the program, and means for uninterruptedly driving the tape at constant speed, with or without means for shifting the light source and the photo-electric cell crosswise of the tape in order to make use of apertures variously spaced across the tape.

The invention also comprises the improvements to be presently described and finally claimed.

In the following description reference will be made to the accompanying drawings forming part hereof which illustrate the invention in application to train dispatching and in which, Figure 1 is a side view of apparatus embodying features of the invention.

Figure 2:
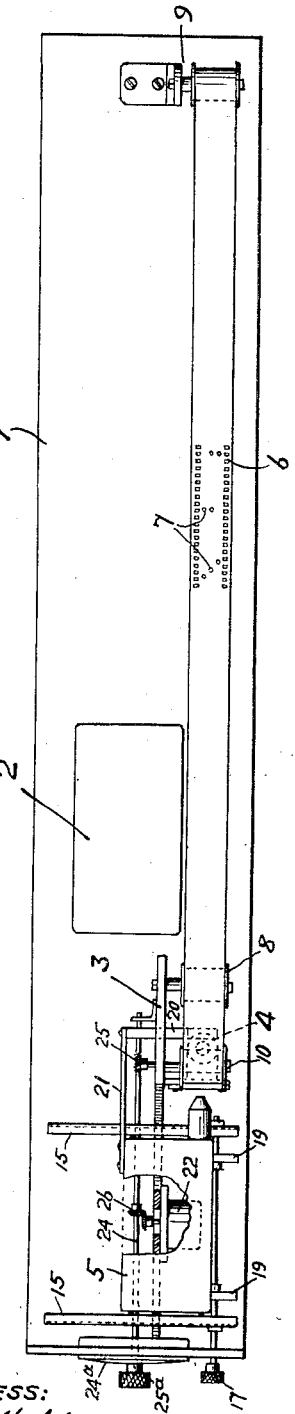
Figure 2 is a top or plan view of the same.
Figure 1:
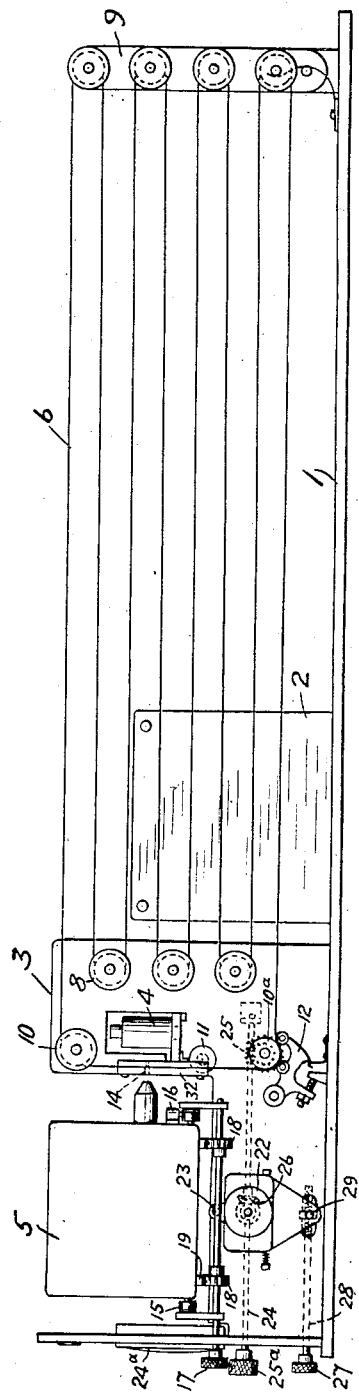
Figure 5:
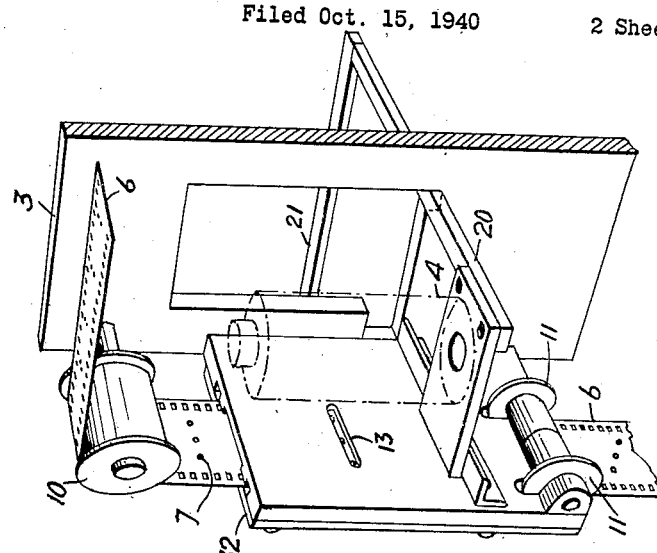
Figure 5 is a perspective view looking from the inside of the photo-electric cell structure.
Figure 6:
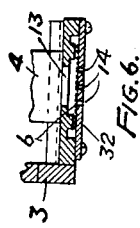
Figure 6 is a transverse sectional view of Figure 4.
Figure 4:
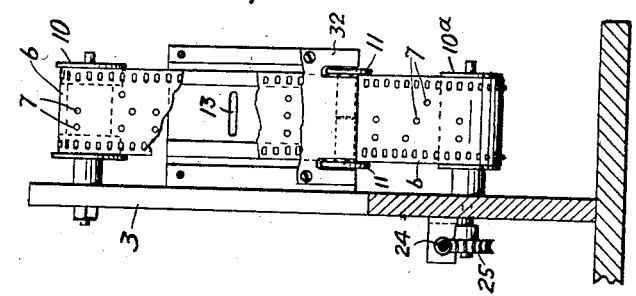
Figure 4 is an end view with parts broken away illustrating a portion of the tape and some of its accessories.
Figure 3:
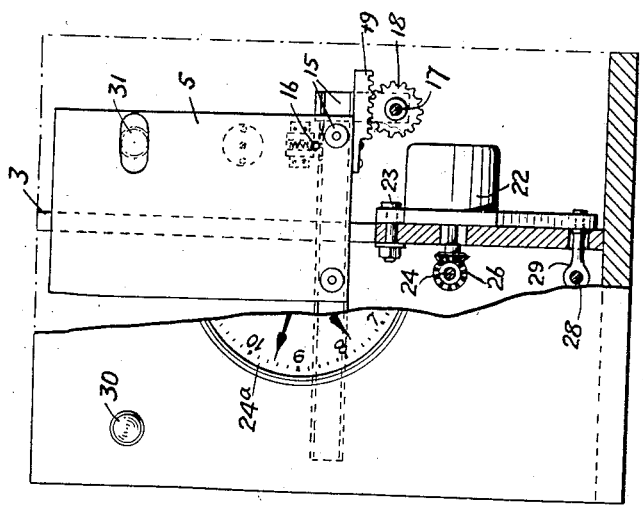
Figure 3 is an end view of the device partly in section.

In the drawings, 1 indicates a base or panel upon which the various parts are mounted. 2 indicates a photo-electric relay operating a controller. This apparatus is too well understood to require detail illustration or description. The controller which it operates is, in the present instance, a signal in response to which trains and the like are started. 3 generally indicates a mounting plate supporting a photo-electric cell and auxiliary equipment and the cell operates the relay. The cell itself is indicated at 4. 5 indicates a light source including a lens system arranged to direct a beam of light on the cell. The beam of light is continuous while the device is in operation. 6 indicates an endless opaque tape movable between the lens system and the photo-electric cell. The endless opaque tape 6 is shown as marginally provided with a row of perforations by means of which it is driven. The tape is provided with transparent spots shown as three rows of perforations 7. The tape 6 is shown as an endless band and it runs over guide rolls 8 of which some are carried by a spring pressed arm 9. The guide rolls 10 and 11 are arranged to direct the belt between the photo-electric cell 4 and the light source 5. One of the guide rolls 11, Figure 5, is made in two parts spring pressed so that it constitutes an edge guide. The sprocket wheel 10a is provided with two toothed wheels and it serves to drive the tape 6. 12 is a spring pressed pivotal arm having two idle rolls which serve to cause the tape to extend around the sprocket wheels sufficiently to insure accuracy in driving. A tape guide plate with slot 13 is mounted on plate 3 between the tape 6 and the photo-cell 4 and on the other side of the guide plate between the tape 6 and the light source 5 is a plate with three apertures 14 with which the perforations 7 in the tape are adapted to come into alignment. The lens system 5 and the cell 4 are movable transversely of the panel 1 so that they can be put in line with any one of the three rows of perforations 7. The lighting source 5 is movably mounted on rollers arranged to move in ways 15. The light source is also provided with spring pressed balls 16, Figure 3, which take into openings in the top flange of the ways. The openings and the spring pressed balls serve to position the light source 5 so that its beam will come opposite one or the other of the holes 14. The light source is moved by means of a knob 17 and its shaft through the intervention of gear wheels 18, Fig. 3, which mesh with the rack 19 attached to the light source. The cell 4 is mounted on a slide 20 having an arm 21 by means of which it is connected to the light source so the cell 4 moves in line with the beam emitted from the light source. The parts 3 and 5 are moved sidewise by means of the knob 17. There is a constant speed or telechron motor 22 and it is carried on a bracket pivoted at 23. The motor drives the sprocket wheel 10ª through the shaft 24 and the worm wheel 25 and the miter gears 26. The shaft 24 drives clock dial or more accurately the hands thereof 24ª and extends through the front plate of the machine and is provided with a knob 25ª adapted to be turned by the hand to set the tape and clock dial hands in synchronism when the shaft is out of gear with the motor 22. To put the motor into and out of gear with the shaft 24 use is made of a knob 27 and shaft 28 and the threaded connection 29. By turning the knob 27 the motor is turned about its suspension pivot 23 thus putting the gears 26 into or out of mesh. On the front of the device there are two lights. The light 30 is a telltale light in circuit with the controller or signal operated by the photo-electric relay 2. The circuit is not shown because it is too well understood how a telltale signal light is operated to require illustration or description. The other light 31 is lighted through a window in the light source 5.

When the described apparatus is used for dispatching trains or the like its operation may be described as follows: The tape is laid off in intervals of time and the three rows of perforations are used, one for example for the week-day schedule, another for the Saturday schedule, and the third for the Sunday schedule. Considering each line of perforations, the perforations are made at times corresponding to a prearranged schedule. A schedule frequently involves intervals of time such as minutes and also various fractions of minutes. The tape is then arranged in the form of an endless belt and is applied over the guide rolls as shown in the drawings. The plate 32, which is provided with the three apertures 14, is detached and replaced for this purpose and the arm 12 is turned right-handed so that its rollers clear the tape. The tape is then properly positioned by disengaging the motor from the shaft 24 by means of the knob 27 and then the shaft 24 is again brought into connection with the motor so that the tape is advanced past the openings 13 and 14. Prior to connecting the tape so that it is driven by the motor the light source and the photo-electric cell are adjusted cross-wise so that the beam of light shines on the desired line of perforations 7 which correspond to week days, Saturdays and Sundays. As the perforations in the tape come opposite the apertures 14 in plate 32, the beam of light actuates the photo-electric relay 2 through the medium of photo-electric cell 4. Photo-electric relay 2 operates the signal or other control.

Evidently the photo-electric cell 4 can be removed through the window or opening shown in the structure in which it is contained. It may be remarked that the spring pressed arm 9 facilitates the application and removal of the tape. In the operation of setting the tape the clock 24ª is also set and the motor is stopped when required.

Evidently there is provided a compact easily arranged and operated mechanism by means of which a controller or signal is automatically operated according to one or more schedules.

It will be obvious to those skilled in the art that modifications may be made in details of construction and arrangement and in matters of mere form without departing from the spirit of the invention.

I claim:

1. Automatic program control mechanism comprising in combination a photo-electric relay operating a controller, a single photo-electric cell operating the relay, a light source including a lens system constantly directing a beam of light on the cell and mounted for sidewise movement in respect to the direction of the beam of light, an opaque tape having spaced lines of transparent spots and mounted between the lens system and the photo-electric cell the relative positions of the spots in the progression being the sole means for timing the operation of the controller, rotary motor means for driving the tape continuously at constant speed, and means for shifting the photo-electric cell sidewise in respect to the direction of the beam of light to align its beam of light with any of the rows of translucent spots.

2. Automatic control mechanism comprising in combination a photo-electric relay provided with and adapted to operate a controller, a photo-electric cell operating the relay, a light source including a lens system directing a beam of light on the cell means for constantly illuminating the source of light, an opaque tape movable between the lens system and the photo-electric cell and provided with transparent spots, a clock dial having hands, a constant speed motor for driving the tape and hands, driving mechanism interconnecting the tape and hands, and manually operated clutch mechanism for disconnecting the motor without disconnecting the hands and tape from each other to keep the hands and tape in synchronism.

3. Automatic mechanism for controlling a program at any desired interval of time or fraction thereof comprising in combination a horologically independent constant speed rotary motor, a photo-electric relay associated with and adapted to operate a controller, a photo-electric cell operating the relay, a light source operatively independent of the motor and including a constantly illuminated lens system continuously directing a beam of light towards the cell, a narrow strip of opaque material movable between the lens system and the photo-electric cell, mechanical connections between the motor and the strip for driving the latter at constant linear speed, the strip being provided with transparent spots, the distance between which in progression is predetermined at will and fixes the time interval or fraction thereof during which the beam of light is obscured from the photo-electric cell by the opaque portion of the traveling strip.

4. Automatic program control mechanism comprising in combination a photo-electric relay provided with and adapted to operate a controller, a photo-electric cell operating the relay, a light source including a lens system constantly directing a beam of light on the cell, means for constantly illuminating the light source, an opaque tape movable between the lens system and the photo-electric cell and provided with translucent spots, the distance between which in progression determines the time intervals or fractions thereof between successive illuminations of the photo-electric cell, a constant speed rotary motor independent of the means for illuminating the light source and connections from the motor driving the tape at constant linear speed.

5. Automatic program control mechanism comprising, in combination, a photo-electric relay operating a controller, a single photo-electric cell operating the relay, a member having a row of openings providing access for a beam of light to the photo-electric cell, said cell being mounted for sidewise movement along the row of openings, a light source including a lens system directing a constant beam of light toward the cell and movable sidewise with said cell, an opaque tape movable between the lens system and the photo-electric cell and provided with parallel rows of transparent spots, said spots being spaced in the respective rows at any desired distance apart and the rows being spaced to correspond with the spacing of said opening, said transparent spots constituting the sole means for timing the operation of the controller, means for driving the tape continuously and at a constant speed to bring successive transparent spots into alignment with said row of openings, and provisions for shifting the photo-electric cell and the light source sidewise.

WILLIAM N. BODKIN.